United States Patent [19]

Elliott

[11] 4,088,727
[45] May 9, 1978

[54] METHOD OF SOLIDIFYING MOLTEN MATERIAL

[76] Inventor: Herbert James Elliott, 63 Poulton Estate, Bradford-on-Avon, England

[21] Appl. No.: 685,849

[22] Filed: May 13, 1976

[30] Foreign Application Priority Data

Jun. 19, 1975 Canada .................................. 229688

[51] Int. Cl.² .......................... B29D 7/24; B29D 7/02
[52] U.S. Cl. ..................................... 264/130; 264/131; 264/213; 264/300
[58] Field of Search ............... 264/213, 131, 130, 180, 264/211, 337, 338, 300; 425/31, 316, 223, 378 R; 23/273 R, 308 S; 62/345

[56] References Cited

U.S. PATENT DOCUMENTS

| | | | |
|---|---|---|---|
| 898,378 | 9/1908 | Kohler | 23/308 S |
| 1,497,649 | 8/1924 | Marx | 23/308 S |
| 3,264,389 | 8/1966 | Sims | 264/131 |
| 3,440,026 | 4/1969 | Dubow | 23/308 S |
| 3,725,518 | 4/1973 | Gaffney | 264/130 |
| 3,819,793 | 6/1974 | Elliott | 264/213 |
| 3,842,153 | 10/1974 | Owen et al. | 264/170 |
| 3,912,431 | 10/1975 | Ellithorpe et al. | 425/223 |
| 3,988,085 | 10/1976 | Krchma | 264/180 |

FOREIGN PATENT DOCUMENTS

1,136,901  12/1968  United Kingdom ............... 23/308 S

Primary Examiner—Jay H. Woo
Attorney, Agent, or Firm—Arthur A. March

[57] ABSTRACT

Process and apparatus for solidifying molten materials by pouring onto a substrate and cooling, in which undesired crystallinity is avoided by first forming a solidified protective stabilizing skin on the melt surface, e.g. by carefully controlled air cooling or dusting with powdered material, before more vigorous cooling by fluid coolant, e.g. air or water, directed against the solidified skin. Optionally, silicone liquids and/or kerosene or other hydrocarbons of lower boiling range are used in minor amounts to treat the melt before pouring to promote the formation of amorphous solidified material and provide increased hardness on aging. When using an endless belt as substrate, the plain solidification surface may be modified by superposing a skeleton framework to form selectively shaped tablet or bar molds. The process and apparatus are particularly applicable to the solidification of molten sulphur.

16 Claims, 9 Drawing Figures

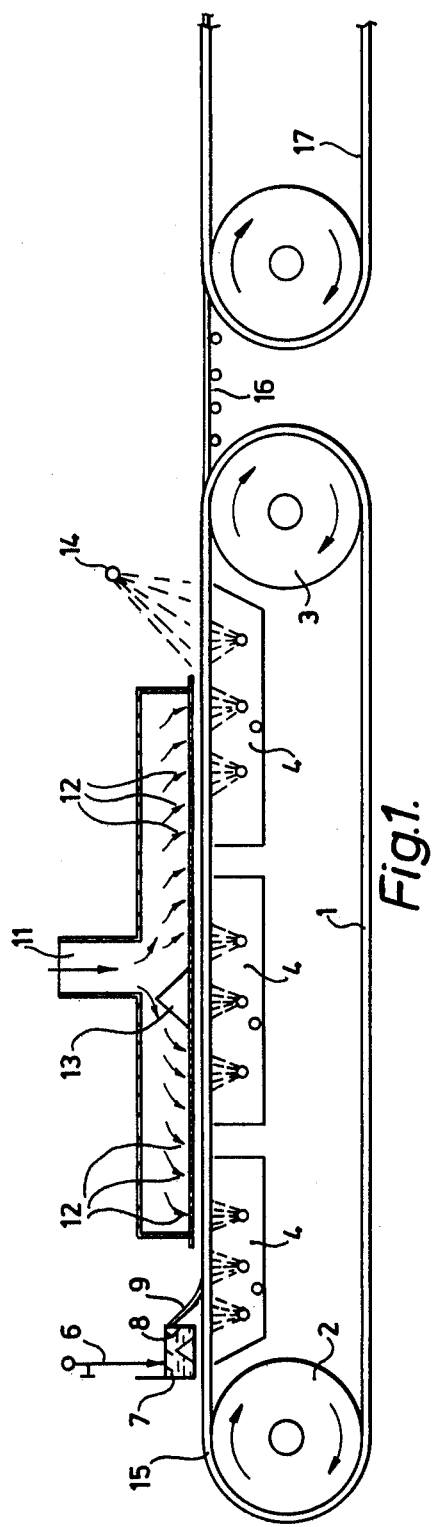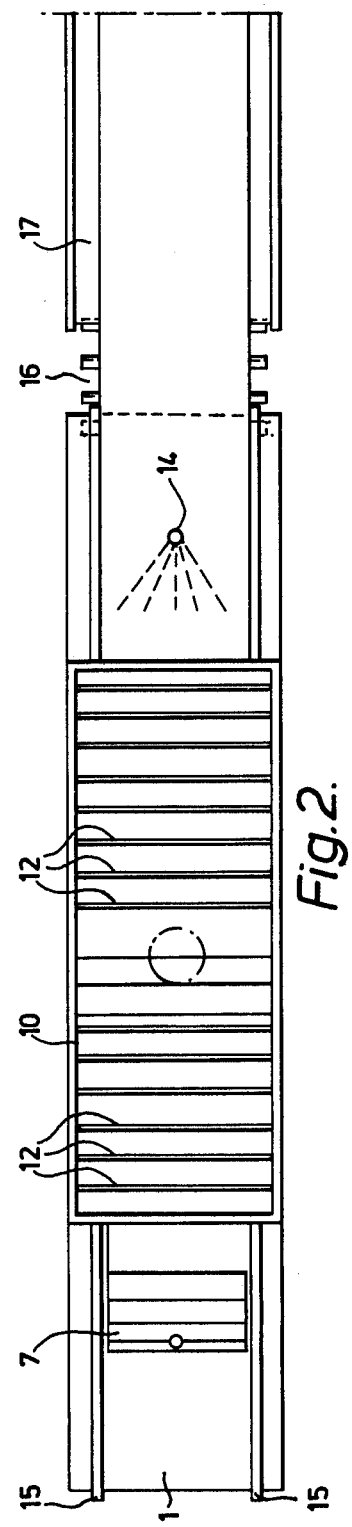

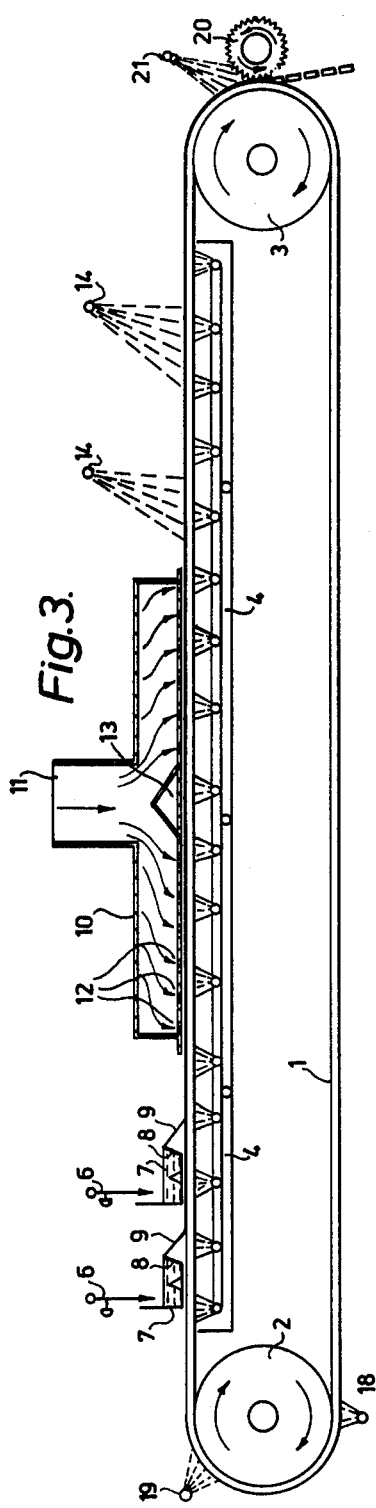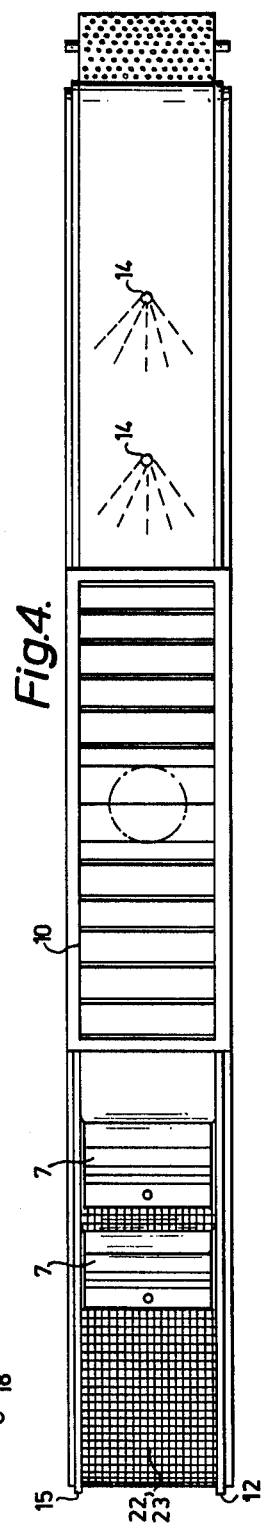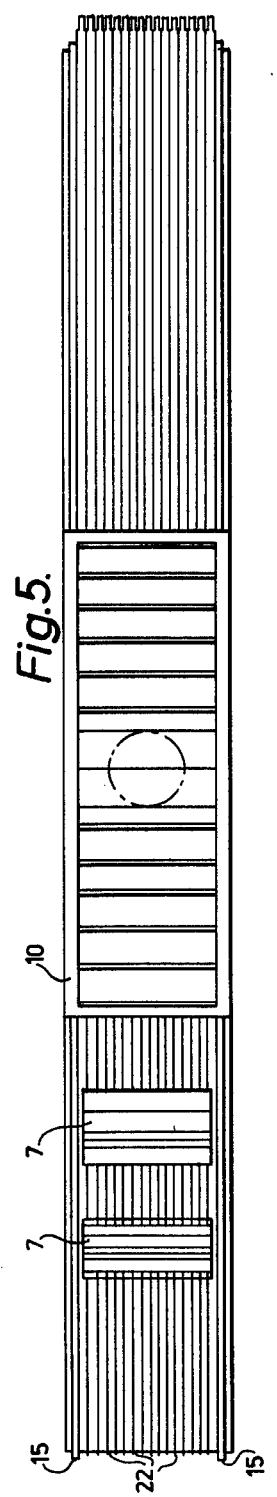

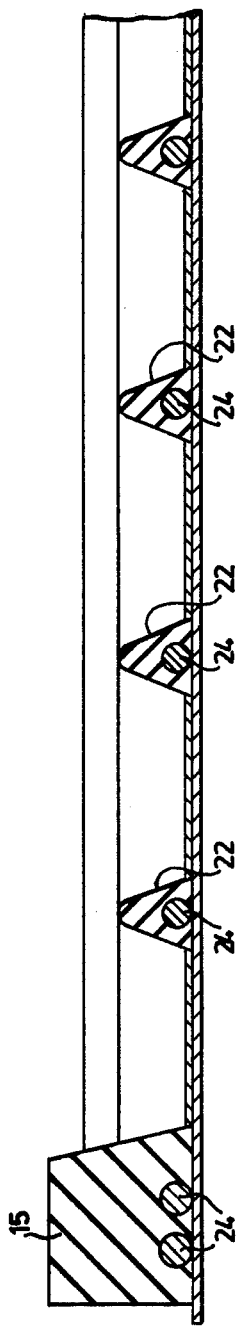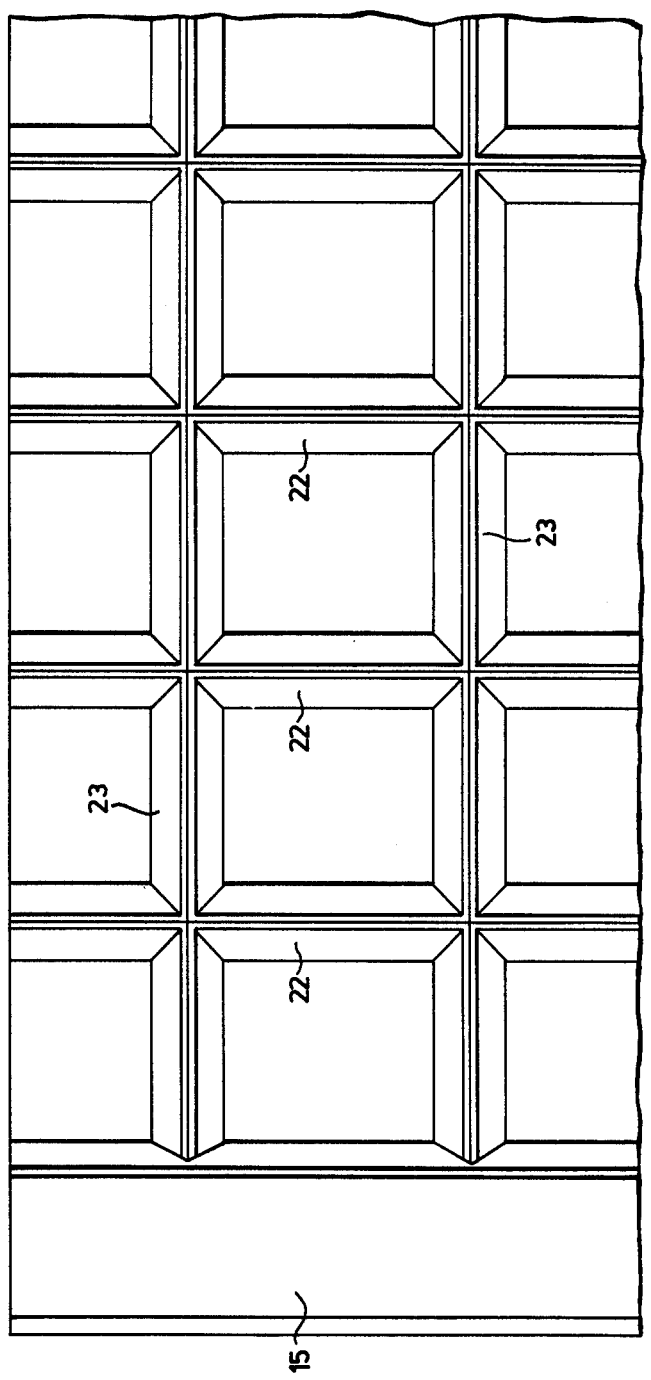

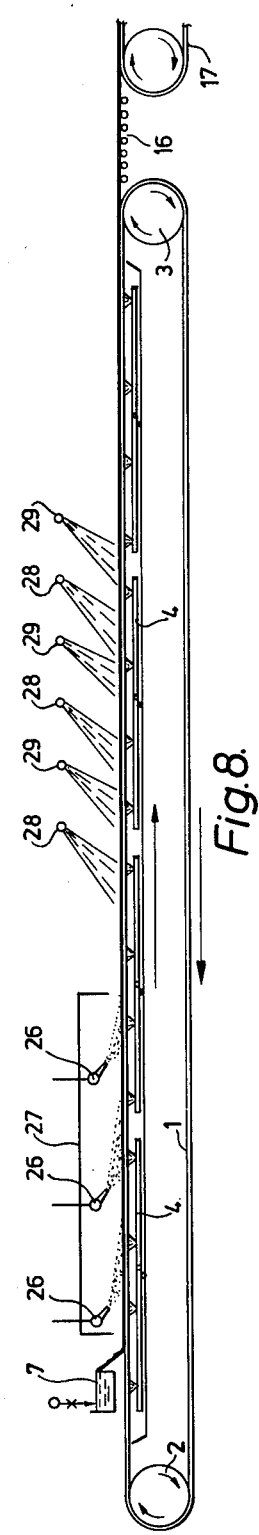
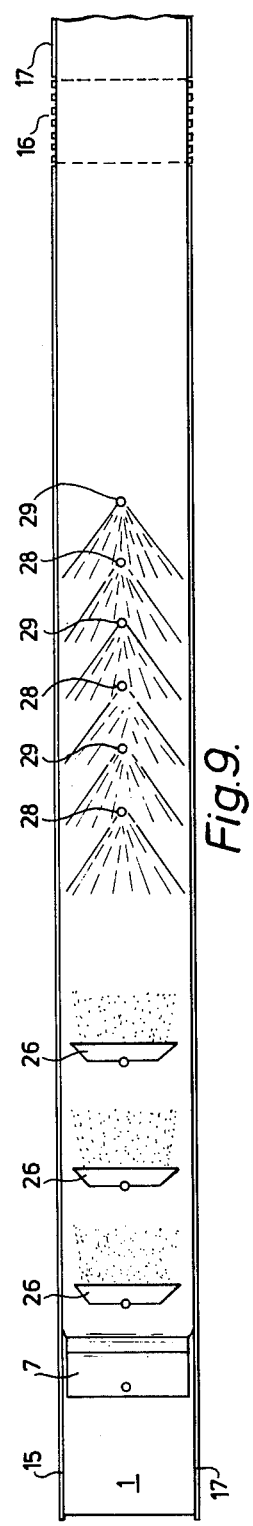
Fig.8.
Fig.9.

METHOD OF SOLIDIFYING MOLTEN MATERIAL

This invention is concerned with the solidification of molten materials, especially sulphur.

The extraction of sulphur from naturally occurring deposits usually results in the sulphur being obtained in molten form. For ease in storage and handling the molten sulphur is usually solidified. Other normally solid materials that are brought to a molten state during their processing and that are often subsequently solidified are thermoplastic materials such as synthetic resins, e.g. polystyrene, bitumen and pitch.

Previously, the solidification of sulphur took place on a large scale in so-called "vats". The problems in recovering such sulphur for further use have led to the development of processes in which sulphur is continuously cast onto moving endless belts (Canadian Pat. No. 859,612) or turntables (U.S. Pat. No. 2,629,895).

In these latter processes one problem encountered is providing a substrate which will withstand continuous working at the temperature of molten sulphur and which has a surface which will allow the solidified sulphur to be stripped without adhesion to the belt or other substrate.

To overcome these problems, I have previously proposed that molten materials should be cast onto various substrates which I have found to be non-bonding to the solidified material (U.S. Pat. No. 3,819,793). In another approach I have proposed pouring the molten material onto "pour strips" positioned on the substrate to minimize the heat-shock to the substrate (Canadian patent application No. 184,901). In another proposal I have provided an anti-adhesion coating of (e.g. for molten sulphur) sulphur dust.

Another problem associated with prior solidification processes, particularly with sulphur, is the formation of pockets of crystallinity in the solidified material. These crystalline regions embrittle the resulting solid, causing dust problems and providing sites for water occlusion both in water-cooling procedures and on exposed stockpiles. It has been proposed to overcome this problem by casting sulphur in thin layers and immediately plunging the layer in a water bath and building up the thickness by further superimposed castings. This reduces crystallinity and moisture entrainment only where the solidifying temperature is obtained below 95° C. (i.e. below the transformation temperature from monoclinic to orthorhombic sulphur). The presence of monoclinic sulphur directly encourages moisture and contaminates occlusion and, overall, substantially weakens the end product.

I have previously proposed (U.S. Pat. No. 3,819,793, which was mainly concerned with avoiding adhesion between solidifying sulphur and a mold or belt surface) to avoid water occlusion by first air-cooling molten sulphur at least to form a surface skin thereon and only then applying water cooling.

I have now discovered that to avoid undesired crystallinity it is important that the initial surface skin should be formed with no substantial disturbance of the molten surface. According to the present invention this condition is achieved either by directing a steady stream of air against the molten material in such a manner as to cause substantially no disturbance of the melt surface, i.e. wherein at most only negligible rippling of the surface is caused, until at least a solidified stabilizing skin is formed, or by applying powdered solidified material to the melt surface until at least a solidified stabilizing skin is formed.

I have also discovered that incorporating a silicone liquid, i.e. organopolysiloxane, or kerosene in the molten material before pouring or casting promotes the formation of a dense or close-grained vitreous or amorphous solidified material on solidification and results in a stronger solidified product. The reason for this overall effect is not yet entirely understood. In addition to kerosene, other hydrocarbons, preferably predominantly straight chain, of lower boiling range, e.g. a boiling range of about 150°-280° C, may be used.

The silicone fluids or liquids that are particularly effective are dimethyl and phenyl-methyl silicones, i.e. dimethyl polysiloxanes or methyl phenyl polysiloxanes, the latter having better heat resistance, having viscosities up to 100,000 centistokes. Specific methyl-phenyl polysiloxanes which have been successfully used are those manufactured by Dow Corning Co. under the references DC710 and DC556, also DC550 and DC510. Specific dimethyl polysiloxanes which have been successfully used are the Dow Corning DC200 series silicone fluids, preferably in the 20-50 centistokes viscosity range. The dimethyl silicones are preferred in situations where the solidifying sulphur melt is contacted with large quantities of water coolant, particularly where the substrate is submerged in a water bath as for example in Canadian Patent No. 859,612, as they appear to provide greater water repellency and thus reduce the risk of water occlusion, when the solidified sulphur is broken up while still in contact with water. These silicone fluids are found to be effective at minor additive quantities of about 5 ppm and above, for example 0.75 gm silicone fluid per 50 kg sulphur but suitably effective quantities can be readily determined by simple empirical tests. Above about 30 ppm no increase in beneficial effect is normally achieved. The hydrocarbons may be used in similar minor quantities separately or as a solvent aid for the silicone liquid. Of the specific silicone liquids mentioned above, kerosene is compatible (i.e. as solvent aid) with DC550 and 510 but not DC710 and 556.

The preferred substrate for pouring or casting molten materials according to the present invention is an endless belt of stainless steel, for example the type known as a "Sandvik" belt. This provides good heat exchange from the molten material as it is undergoing cooling through the metal belt which is sprayed by water jets on its underside. Direct mild cooling of the molten material is preferably provided by means of a hood extending longitudinally of the belt and positioned a few inches above the melt surface. Transverse slotted outlets may be provided in the hood to control the gentle air flow or air flushing pressure so as to avoid disturbing the melt surface. Once the initial surface solidified protective stabilizing skin has been formed, direct intensive cooling may be carried out with a fluid coolant directed against the solidified skin, such as by more vigorous air blasts or by water jets, the latter preferably in the form of an atomized water spray which after contact evaporates from the still warm solidified surface, giving additional evaporative cooling and advantageously avoiding water occlusion.

The feed of molten material onto a moving substrate, which may be in the form of an endless belt, or a drum or a turntable, may be by means of a weir overflow from a trough, preferably steamjacketed to prevent premature solidification, positioned transversely to the direction of movement of the substrate. Alternatively, the feed from the trough may be by a plurality of suitably distributed and positioned gullies providing a plurality of streams of molten material which impinge individually on the substrate before merging to cover the substrate. This form of feed is especially advantageous if the substrate has been treated with water prior to feeding to reduce the substrate temperature. As described in my Canadian patent application No. 184,901, in such circumstances the use of individual streams minimizes water occlusion from the substrate surface. It is also possible to feed the molten material from conventional pastillating heads. This reduces the throughput of the system but the pastille product form may be desirable in some instances and the beneficial effect of the additives is still achieved.

To allow the molten material as it is fed to build up a satisfactory thickness on the substrate, rubber retaining strips may be provided at the substrate confining edges. When the substrate is an endless belt the strips as lateral confining edges must be of sufficient flexibility to pass continuously over the selective curvature of the terminal pulleys. The rubber must also be able to withstand continuous operation at the temperature of the molten material. As a result, silicone rubber (particularly phenyl-silicone rubber) is the particularly preferred material although I have also found it possible to operate satisfactorily with neoprene strips which have been dressed with a silicone fluid.

When the substrate has a plain or flat surface, the solidified product is obtained in slab or so-called "slate" form. On an endless stainless steel belt sufficiently solidified material of sufficient thickness, i.e. above    inch, comes away from the belt as it begins to traverse the terminal pulley and breaks after approximately 40 to 50 cms of deflection. If the interior of the slab has not fully solidified at this time, or is above 95° C, then the exposed material will solidify in monoclinic crystalline form. Accordingly, in order to avoid this result, either the belt should be of sufficient length to insure complete solidification before removal of the solidified material, or else the partially solidified material should be passed, unbroken, from the belt on which initial cooling has taken place to another belt to complete the cooling. This latter process is particularly suitable for operation with an endless stainless steel belt wherein the casting becomes free of the belt surface before it is solidified throughout. As the belt returns around the terminal pulley the casting may be maintained in the horizontal plane forwardly supported by bridging rollers and led onto another conveyor for further cooling under natural or forced conditions. Because of the initial cooling that has taken place on the steel belt in solidifying the outer or marginal surface portions of the casting, i.e. to a sufficient structural strength, the second conveyor may use a belt of conventional construction, e.g. rubber, canvas, or the like, and can be of a grade which could not have been used initially to receive molten material. Thus the length of expensive stainless steel belting required can be minimized. The second conveyor is preferably slightly wider than the feeder belt and operates at the same speed. Further cooling means as desired may be provided at suitable intervals therealong.

On the second conveyor the slab can be desirably broken on passing over the terminal pulley in the same way as noted above, or a profiled roller or other breaker may be brought into contact with the slab for this purpose as it passes along the particular conveyor.

In the case of drums or turntables, combinations of scraper blades and/or breaker rollers may be required to remove such solidified material.

The necessity to break the slab of solidified material can cause problems of thereby generated air-borne dust with resultant pollution and fire hazards, and often causes large quantities of unwanted fines. Also, the slates break into random shapes and sizes. I have already proposed in Canadian patent applications Nos. 184,901 and 184,902 that molten material should be solidified in the form of uniform tablets or cubes. The considerations of the present invention may equally be applied to the production of sulphur in these solid object forms. These forms may be achieved by molding suitable recesses into a conventional rubber conveyor belt surfaced with a suitable heat resistant material, or such belt may be provided with suitably shaped tiles bonded to the belt surface, preferably of phenyl silicone rubber. However, such belts restrict the thickness of cast sulphur products due to their inherent heat resistant property, and in the first-mentioned case, are basically unsuitable as in a comparatively short length of time their heat resistant surfacing is dissolved by continuous contact with molten sulphur. However, such materials may more suitably be used on drums and turntables where substrate flexing is avoided. It is also possible to impress suitable recesses into the steel belts currently conventionally used but this would severely if not wholly impair their desirable flexibility.

Instead, according to the invention, steel substrates, or other plain substrates capable of withstanding the contemplated working conditions, may be suitably adapted by positioning thereon a skeleton framework which defines the sidewalls of a tablet mold, the surface of the steel or other substrate forming the floor of the mold. In one form the framework may be of silicone rubber bonded to the substrate with a suitably heat resistant adhesive. In another form, the framework is made up at least longitudinally along the belt path from a plurality of metal sections, each section being linked by metal wire, or by provided inherent magnetization, or each being individually spot welded to the metal substrate to allow the substrate to flex as it passes around the pulleys of a conveyor belt installation. Transversely there is no flexing so that it is not necessary that the metal framework be broken into sections, i.e. parallel sections along the endless path.

In the wire linked or magnetically linkable forms, the framework is suitably removable so that the substrate may be used in its plain or flat form. The linked forms may be retained on the substrate by magnetization, e.g. utilizing them as magnetizable and magnetic or electromagnetic elements in cooperating conventional interacting association, and to increase the adhesive effect and for greater speed of addition and removal are preferably formed into modules or units containing a number of recesses.

Alternatively, the linking wire may be passed through through-bores in the individual sections and the wire tensioned around the terminal pulleys of the belt over the belt surface, the ends of the wire being welded or clamped together. In this way problems of adhesion of the sections to the belt are avoided. Similarly, a silicone rubber framework can be bonded to steel wire cable or tape and stressed and secured in position on a plain belt. The exposed joint is covered by a so-called "gaiter" of similar material, which may be cured in situ to bond to the already positioned rubber and wire.

The sidewalls or lateral confining edges or wall divider elements of each framework should preferably be of triangular cross-section with the apex lying above the substrate being rounded to allow easy release of the solidified material. In addition, the sidewalls are preferably dressed with a silicone fluid before use.

In pouring or casting molten material into such a framework it is preferable to allow the molten material to rise slightly (e.g. ¼ inch) above the sidewalls. This advantageously allows the solid material to be removed as a slab, insuring that all the tablet recesses are emptied. In subsequent handling the slab breaks cleanly into tablets or smaller slabs conveniently along the lines of weakness formed by thin layer of material above the impression left by each sidewall. The resulting appearance of sulphur solidified in this manner has given rise to the name "candy-bar" sulphur. In an alternative form the transverse profiles may be omitted, so that solidified material may be obtained in continuous or longitudinal bar form.

The temperature at which molten material is poured onto the substrate should not be so close to its melting point as to produce premature uncontrolled solidification possibly in an undesired crystalline form, or so high as to require an excess of cooling capacity. In the case of molten sulphur, a temperature of 145°–150° C is convenient, this being the approximate range at which freshly mined molten sulphur exits from degassing equipment in which H₂S is removed. In certain climatic conditions it may be desirable to cool the molten sulphur to below this temperature range but the temperature should preferably remain above 125° C, e.g. at least roughly at about 130° C.

If it is cooled to say 120°–125° C and air cooling is used, it is found that the surface of the molten sulphur quickly solidifies in the undesired monoclinic structure with a rough crater-like appearance. The sulphur slate obtained loses strength after a few days and crumbles and breaks easily. However, if the freshly poured molten sulphur is not treated to air cooling but is dusted gently with fine sulphur particles (fine enough not to form a rough sandpaper-like end surface finish on solidifying) no such monoclinic transformation occurs. On stabilizing the melt surface as described (so that no further surface fusion of the sulphur dust particles occurs), followed by direct application of fluid coolant against the solidified protective skin, such as either water spray cooling, or air blasts, or a combination of both, or contact with a water soaked sponge cloth roller for evaporative cooling, it is found that the sulphur casting on break up is suitably dense and close grained and equally as hard as if not harder than that obtained with continuous air cooling at higher melt feed temperatures, i.e. say from 135°–150° C. It has been found that such a sulphur dusting system operates with equally good results from 120°–150° C, although more dust is required as the melt temperature is increased.

The preferred particle size range for sulfur dusting is about 100% minus 90 mesh BSS, the upper tolerance being preferably with no particles exceeding 1/64 inch. 1/32 inch and above will provide a coarse sand paper surface effect, which will form dust on attrition and is therefore undesirable. Coarser sized particles can only be used when a sufficiently higher melt temperature is to be treated, i.e. say from about 135° to 150° C, but then only as to avoid making an over-rough end surface effect, of about say 1/64 inch to 1/32 inch particle sizing range, although up to about 1/16 inch has been used in practice.

The application of sulphur dust to the melt surface is in some ways preferable to the use of controlled air cooling to stabilize the melt surface by protective skin formation, since with the latter there is always the risk that some disturbance of the melt surface will occur resulting in the formation of undesired monoclinic crystals, though of course some degree of such crystallinity may be tolerated. It will nevertheless be appreciated in this regard that in some circumstances the presence of sulphur dust will not be acceptable, even though the application points or stations may be suitably hooded and subsequently the dust is fused into the solidified material.

If preliminary cooling of the melt is required prior to pouring, it may advantageously be performed by aerating the melt using an impeller-type aerator. This provides ideal conditions for introducing a silicone or kerosene additive into the melt. These optional additives are required to be well-dispersed throughout the melt before casting and preferably a "conditioning" time of at least 4 minutes is allowed to elapse before casting.

Using the controlled air cooling process of the present invention with a silicone additive, it has been found possible to obtain amorphous sulphur "slate" of adequate thickness, e.g. up to ⅝ inch in a single pour of molten sulphur onto a stainless steel Sandvik belt. However, it is possible to build up a thicker layer by using multiple pour points, e.g. tandemly arranged along the belt path, and a laminating technique if desired, provided that the above described cooling precautions are observed after each pour.

Some specific embodiments of the present invention will now be described with reference to the accompanying drawings, in which:

FIGS. 1 and 2 are respectively side and plan views of an installation for solidifying sulphur with controlled air cooling, FIGS. 3 and 4 are respectively side and plan views of an installation for producing "candy-bar" sulphur, FIG. 5 is a view of an installation for producing bar sulphur, FIGS. 6 and 7 are respectively a transverse section and plan view showing in detail a portion of the belt used in FIGS. 3 and 4, FIGS. 8 and 9 are respectively side and plan views of an installation for solidifying sulphur using sulphur dust to stabilize the melt surface.

Referring to FIGS. 1 and 2, the installation of one apparatus embodiment according to the invention comprises a heat exchange substrate in the form of a stainless steel endless belt 1, i.e. a uniformly extending solid planar substrate tensioned between terminal pulleys 2 and 3. Enclosed fluid coolant nozzle means or water jets 4 are positioned to impinge on the under surface of the upper strand of the stainless steel belt. Drainage means (not shown) are provided so that water is continuously circulated, i.e. recycled. Molten sulphur is fed from storage via a pipe 6 to feed means including a trough 7. From the trough it overflows a weir edge 8 via a distribution plate 9 onto the molten material receiving solidification surface of belt 1 in direct contact therewith at its upstream receiving station thereat. Air cooling is provided by a distribution hood 10 which is in the form of a closed box having air inlet 11 and outlets indicated at 12 in the form of transverse air flow slots. A movable baffle 13 transversely within the hood allows the air to be directed preferentially to either end of the hood so that variable air pressure on the melt surface may be obtained at the intermediate stream initial skin forming station of the belt thereat. Water cooling is provided by fluid coolant nozzle means such as an atomized water spray 14 directed at the upper surface of the belt, i.e. along the downstream final solidification station portion of the upper strand or course of the belt. Molten sulphur is prevented from laterally running off the edge of the belt by rubber retaining strips 15. A further strip (not shown) may be required transversely behind the trough 7 to prevent backflow. Thus, the sulfur is maintained in static disposition on the uniformly extending substrate without disturbance of either such static disposition of the sulfur or such uniformly extending disposition of the substrate throughout the path of travel of the material through the receiving station, the skin forming station and the final solidification station. Slab sulphur leaving the belt 1 is passed over bridging rollers 16 to a further conveyor 17 on which further cooling takes place.

As a specific example of this apparatus, tests were carried out on a Sandvik stainless steel belt (grade 12R11) of 500 mm width running between 500 mm pulley centers and having an effective cooling length of 4000 mm. The edge retaining strips were of neoprene rubber bonded to the belt. The strips were dressed with silicone fluid before casting. The hood 10 was 2000 mm in length and had 17 slots 12 approximately 8 mm in open width or thickness. The bottom of the hood was 55 mm above the belt surface.

In one test, molten sulphur containing 7.5 ppm of each of Dow Corning silicone fluids DC710 and DC556 was cast onto the above belt moving at 0.8 m/min. to a depth of 13 mm. The rate of throughput of the sulphur was 210 kg/m$^2$h. The feed temperature was 148° C and air was gently fed to the cooling hood at such a mild pressure that the air emerging from the slots caused only the slightest negligible rippling on the surface. The temperature of the coolant water feed to the belt undersprays was 10° C. The sulphur emerging from beneath the hood had a solidified protective stabilizing skin and was then subjected to an atomized water spray as more vigorous intensive coolant. As the solidified sulphur reached the end of the belt all the water had evaporated and the solid sulphur was at a temperature of 70° C. The sulphur was freed from the belt and allowed to break under its own weight as it passed over the terminal pulley. Examination of this solidified sulphur advantageously showed it to be substantially amorphous and free from monoclinic crystals.

A similar test was conducted using sulphur treated with 5 ppm of each of the same fluids under the same conditions except that the belt speed was 0.7 m/min. and the throughput was 219 kg/m$^2$h. Again a 13 mm thick slab of such amorphous sulphur was obtained.

In similar tests in which the pressure of air was such that disturbance of the surface was caused, the solidified slabs were found to contain monoclinic crystals extending down from the air-cooled surface. Crystallinity also occurred in similar tests with no air cooling and no silicone additive.

It was found advantageously that solidified sulphur containing silicone additives hardened on aging, as opposed to that obtained without additive which tended to lose strength and become brittle.

FIGS. 3 and 4 show similar views to that of FIGS. 1 and 2 for an installation for producing "candy-bar" sulphur under the same conditions. Similar parts have been given the same reference numerals as in FIGS. 1 and 2. Optional additional features, apart from the structure of the belt which is described below with reference to FIGS. 6 and 7, include the provision of an additional feed trough 7 as one trough may not provide sufficient feed to fill the tablet molds to the required depth and an additional water spray 14 in view of the possibility of increased casting depth compared to slate production. On its return path the belt may optionally be treated with water or water/kerosene mixture from spray point 18 both for suitably cooling the belt and reducing the tendency of adherence of the castings to the belt, and also optionally with sulphur dust from delivery point 19 for a release coating as described in Canadian patent application No. 184,902.

The solidified material will break up into individual tablets or slabs of several tablets as it passes over the terminal pulley 3 but they may not always release from the molds under their own weight. Removal is accomplished by terminus recovery means such as in the form of a cooperating end roller 20 having a surface of rubber suction caps which are pressed against the tablets as they traverse the terminal pulley. A water spray 21 provides further cooling thereat and assists the operation of the suction caps.

Referring to FIGS. 6 and 7, the tablet mold skeleton profile framework used in FIGS. 3 and 4 is made up from longitudinal wall divider members such as phenyl silicone rubber profiles 22 and transverse profiles 23 of similar material. Each of the profiles has a triangular cross-section with a rounded apex. The longitudinal profiles 22 have a core 24 of steel wire cable which is stressed or tension mounted around the endless belt 1 and then the free ends are welded or clamped together. The join is covered by a "gaiter" of similar material molded in situ. The retaining lateral edge portions 15 may with advantage be positioned in the same manner as shown in FIG. 6 as the effects of continuous high temperature working reduces the strength of the adhesives used hitherto. If additional bonding is required the core cables 24 may be split welded to the metal belt 1 at intervals. The transverse profiles 23 need not contain core cables as they are practically unaffected by flexing of the belt on traversing the terminal pulleys, and they may be bonded directly to the belt or merely buttbonded to the adjacent longitudinal profiles 22.

In the example shown in FIG. 6, the side portions 15 are approximately 1 inch high and the profiles approximately ½ inch high. The transverse profiles are bonded to the substrate by an adhesive layer. As shown in FIG. 6, the pour of molten sulphur from the first trough 7 fills the selectively shaped molds to the region of the apex of the profiles and the second trough provides a further ¼ inch overall cover. This allows the solidified material to be removed more easily in slabs of several tablets. In initial handling, i.e. passage to a stockpile, these advantageously break along the lines of weakness formed by the profiles to form individual uniform tablets of corresponding selective shape. The use of the silicone additive described earlier advantageously causes the tablets to increase in hardness with aging so that subsequent handling causes negligible further breakage.

FIG. 5 shows a modification of the installation described with respect to FIGS. 3, 4, 6 and 7 in that only longitudinal profiles 22 are provided. In this case it is not necessary that the molten sulphur should extend above the apex of the profiles, and the result is the formation of selectively shaped continuous rod or bar form solidified sulphur. As the shaping of the profiles is less complex, the rods can be allowed to break and release under their own weight as they traverse and extend beyond the terminal pulley.

The feed from the first feed trough 7 may be by gullies feeding directly into the spaces between the longitudinal profiles 22. The second trough is available if an overall cover of sulphur is required as in the case of the tablets shown in FIG. 6.

FIGS. 8 and 9 show an installation comparable to that of FIGS. 1 and 2 but with the replacement of air hood 10 by spreaders 26 for supplying powder material, e.g. sulphur dust, to the molten surface to solidify and stabilize the surface. Again similar parts are given the same reference numerals as used in FIGS. 1 and 2.

The spreaders 26 are enclosed in hood 27 fitted with extraction equipment (not shown) to remove air-borne dust. Spreaders of the conventional type used in agricultural dusting are suitable.

Apart from the use of the dust spreaders 26, operation of this installation is as described for FIGS. 1 and 2. An optional alternative tandem arrangement of water sprays 28 and air jets 29 is shown for cooling the skin solidified molten sulphur. The air jets 29 increase the rate of evaporative cooling from water applied by the preceding sprays 28.

It will be readily appreciated that the instant process and apparatus are also applicable for solidifying other normally solid materials that are provided in corresponding molten state as a result of their particular processing, such as thermoplastic materials, including synthetic resins of the well-known type, as well as bitumen, pitch, and the like, and that such solidifying can also be carried out on an otherwise conventional drum or turntable modified to provide the instant feed means for the molten material, treating agent distribution hood means for supplying the skin promoting treating agent, and fluid coolant nozzle means for directing fluid coolant against the formed skin of the molten material.

Where powdered material treatment is used initially to form the solidified protective stabilizing skin on the melt surface of the molten material poured onto the particular substrate, preferably such powdered material will constitute dust size particles of the same material as that being solidified, e.g. preferably not exceeding about 1/64 inch thermoplastic synthetic resin, bitumen, pitch, or the like, as the case may be.

Thus, an improved overall method and apparatus are advantageously provided for solidifying molten material such as sulphur, and synthetic and natural thermoplastic materials, involving pouring or casting the molten material onto a substrate for controlled stage stabilizing cooling, initially selectively forming a solidified, crystallinity inhibiting or suppressing, protective stabilizing skin on the melt surface of the molten material on the substrate under such controlled conditions as to occur without substantial disturbance or rippling of the molten surface, and thereafter finally solidifying such material by intensively cooling such material with a fluid coolant directed against the solidified protective stabilizing skin. Such skin may be formed by treating the melt surface with skin promoting treating agent, e.g. by mildly cooling the melt surface with air jets directed thereagainst at a relatively gentle air flushing flow pressure which is insufficient to cause substantial disturbance of the melt surface, or by mildly treating or dusting the melt surface with powdered material, i.e. of the same kind as that being solidified, gently applied to such surface for such purposes. Moreover, where the starting molten material contains dispersed therewithin silicone fluid and/or kerosene, upon cooling on the substrate improved properties are obtained advantageously in the resultant solidified product.

It will be appreciated that the foregoing specification and drawings have been set forth by way of illustration and not limitation, and that various modifications and changes may be made therein without departing from the spirit and scope of the present invention, which is to be limited only by the scope of the appended claims.

What is claimed is:

1. Method for solidifying molten material into amorphous form while substantially avoiding crystallinity thereof and water occlusion therein, comprising pouring the molten material onto a uniformly extending solid planar substrate and in direct contact therewith and maintaining such molten material in static disposition on such uniformly extending substrate for controlled stage cooling, initially selectively mildly forming a solidified, crystallinity inhibiting, protective stabilizing skin on the melt surface of such molten material on the substrate without substantial disturbance and rippling of the molten surface and without disturbance of the uniformly extending disposition of the substrate and correspondingly of the static disposition of the molten material thereon and in the substantial absence of attendant liquid, thereafter finally solidifying such material by intensively cooling such material with a fluid coolant directed against the solidified protective skin likewise without disturbance of the uniformly extending disposition of such substrate and correspondingly of the static disposition of such material thereon, and recovering the solidified material in substantially amorphous form.

2. Method according to claim 1 wherein the molten material is molten sulfur, the fluid coolant for the final solidifying comprises at least one of water spray and vigorous air jet, and the substrate is an endless uniformly extending belt.

3. Method according to claim 1 wherein the molten material prior to pouring contains dispersed therewithin an effective minor amount of amorphous solidification-promoting and increased hardness on aging-promoting property improving modifying additive from the group of silicone liquid, kerosene, other corresponding hydrocarbons of lower boiling range, and mixtures thereof.

4. Method according to claim 3 wherein the modifying additive is a dimethyl silicone or a phenyl-methyl silicone.

5. Method for solidifying molten material into amorphous form while substantially avoiding crystallinity thereof and water occlusion therein, comprising pouring the molten material onto a uniformly extending solid planar substrate and in direct contact therewith and maintaining such molten material in static disposition on such uniformly extending substrate for controlled stage cooling, initially selectively forming a solidified, crystallinity inhibiting, protective stabilizing skin on the melt surface of such molten material on the substrate by mildly cooling such surface with an air jet directed thereagainst at a relatively gentle air flushing flow pressure which is insufficient to cause substantial disturbance and rippling of the molten surface, and without disturbance of the uniformly extending disposition of the substrate and correspondingly of the static disposition of the molten material thereon, thereafter finally solidifying such material by intensively cooling the mildly cooled material with a fluid coolant directed against the solidified protective skin likewise without disturbance of the uniformly extending disposition of such substrate and correspondingly of the static disposition of such material thereon, and recovering the solidified material in substantially amorphous form.

6. Method according to claim 5 wherein the molten material is molten sulfur.

7. Method according to claim 6 wherein the molten sulfur is poured at a temperature of about 130° to 150° C, the fluid coolant for the final solidifying comprises at least one of water spray and vigorous air jet, and the substrate is a heat exchange endless uniformly extending belt maintained in cooled condition.

8. Method according to claim 7 wherein the belt is cooled on its underside by a stream of water spray directed there against.

9. Method according to claim 5 wherein the molten material prior to pouring contains dispersed therewithin an effective minor amount of an amorphous solidification-promoting and increased hardness on aging-promoting property improving modifying additive from the group of silicone liquid, kerosene, other corresponding hydrocarbons of lower boiling range, and mixtures thereof.

10. Method according to claim 9 wherein the molten material is molten sulfur.

11. Method for solidifying molten material into amorphous form while substantially avoiding crystallinity thereof and water occlusion therein, comprising pouring the molten material onto a uniformly extending solid planar substrate and in direct contact therewith and maintaining such molten material in static disposition on such uniformly extending substrate for controlled stage cooling, initially selectively forming a solidified, crystallinity inhibiting, protective stabilizing skin on the melt surface of such molten material on the substrate by mildly treating such surface with powdered material gently applied thereto which is insufficient to cause substantial disturbance and rippling of the molten surface, and without disturbance of the uniformly extending disposition of the substrate and correspondingly of the static disposition of the molten material thereon, thereafter finally solidifying such material by intensively cooling the mildly cooled material with a fluid coolant directed against the solidified protective skin likewise without disturbance of the uniformly extending disposition of such substrate and correspondingly of the static disposition of such material thereon, and recovering the solidified material in substantially amorphous form.

12. Method according to claim 11 wherein the molten material is molten sulfur and the powdered material is fine sulfur particles.

13. Method according to claim 12 wherein the molten sulfur is poured at a temperature of about 120° to 150° C, the powdered material has a particle size not exceeding about 1/64 inch, the fluid coolant for the final solidifying comprises at least one of water spray and vigorous air jet, and the substrate is a heat exchange endless uniformly extending belt maintained in cooled condition.

14. Method according to claim 13 wherein the belt is cooled on its underside by a stream of water spray directed thereagainst.

15. Method according to claim 11 wherein the molten material prior to pouring contains dispersed therewithin an effective minor amount of an amorphous solidifcation-promoting and increased hardness on aging-promoting property improving modifying additive from the group of silicone liquid, kerosene, other corresponding hydrocarbons of lower boiling range, and mixtures thereof.

16. Method according to claim 15 wherein the molten material is molten sulfur.

* * * * *